(12) United States Patent
Ahn et al.

(10) Patent No.: US 11,388,182 B2
(45) Date of Patent: Jul. 12, 2022

(54) METHOD AND SYSTEM FOR DETECTING WEBSHELL USING PROCESS INFORMATION

(71) Applicant: NAVER Business Platform Corp., Seongnam-si (KR)

(72) Inventors: June Ahn, Seongnam-si (KR); BongGoo Kang, Seongnam-si (KR)

(73) Assignee: NAVER CLOUD CORP., Gyeonggi-do (KR)

( * ) Notice: Subject to any disclaimer, the term of this patent is extended or adjusted under 35 U.S.C. 154(b) by 0 days.

(21) Appl. No.: 17/104,589

(22) Filed: Nov. 25, 2020

(65) Prior Publication Data

US 2021/0168162 A1 Jun. 3, 2021

(30) Foreign Application Priority Data

Nov. 28, 2019 (KR) .......................... 10-2019-0155720

(51) Int. Cl.
*G06F 21/56* (2013.01)
*H04L 9/40* (2022.01)
*H04L 67/02* (2022.01)

(52) U.S. Cl.
CPC ...... *H04L 63/1425* (2013.01); *H04L 63/1416* (2013.01); *H04L 63/1433* (2013.01); *H04L 63/1441* (2013.01); *H04L 67/02* (2013.01)

(58) Field of Classification Search
CPC ............. H04L 63/1425; H04L 63/1416; H04L 63/1441; H04L 63/1433
See application file for complete search history.

(56) References Cited

U.S. PATENT DOCUMENTS

| | | | |
|---|---|---|---|
| 9,239,922 B1* | 1/2016 | Zhu | G06F 21/56 |
| 2014/0215619 A1* | 7/2014 | Lee | H04L 63/1483 |
| | | | 726/23 |
| 2017/0046512 A1* | 2/2017 | Kedma | G06F 11/3003 |
| 2019/0050568 A1* | 2/2019 | Kataoka | G06F 16/245 |
| 2019/0268361 A1* | 8/2019 | Blewett | G06F 16/248 |

FOREIGN PATENT DOCUMENTS

| | | |
|---|---|---|
| CN | 107070913 B | 4/2020 |
| KR | 10-0655492 B1 | 12/2006 |
| KR | 10-2009-0031393 A | 3/2009 |
| KR | 10-2009-0080220 A | 7/2009 |
| KR | 10-2016-0133927 A | 11/2016 |

OTHER PUBLICATIONS

Korean Office Action dated Jan. 26, 2021 issued in corresponding Korean Patent Application No. 10-2019-0155720.
Japanese Office Action dated Nov. 30, 2021 issued in corresponding Japanese Patent Application No. 2020-197137.
Taiwanese Office Action dated Nov. 1, 2021 issued in corresponding Taiwanese Patent Application No. 109140281.

* cited by examiner

*Primary Examiner* — Chirag R Patel
(74) *Attorney, Agent, or Firm* — Harness, Dickey & Pierce, P.L.C.

(57) ABSTRACT

Disclosed is a webshell detection method that detects a webshell by collecting process information about a process in execution on a server providing a web service and by determining whether the process is executed by a webshell based on the collected process information.

20 Claims, 5 Drawing Sheets

METHOD AND SYSTEM FOR DETECTING WEBSHELL USING PROCESS INFORMATION

CROSS-REFERENCE TO RELATED APPLICATION(S)

This U.S. non-provisional application and claims the benefit of priority under 35 U.S.C. § 119 to Korean Patent Application No. 10-2019-0155720, filed Nov. 28, 2019, the entire contents of which are incorporated herein by reference in their entirety.

BACKGROUND

Technical Field

One or more example embodiments relate to methods and/or systems for detecting a webshell that attacks a server providing a web service, and more particularly, to methods and/or systems for detecting a webshell based on execution information about a process in execution on a server providing a web service.

Related Art

A webshell refers to a code that allows a malicious user to issue a command to a server using upload vulnerability of the server. The webshell may be created through a server script (jsp, php, asp, etc.) and such scripts are uploaded through the vulnerability of the server. A malicious user, such as a hacker, may avoid a secure system of the server through the webshell, may access the server without separate authentication, and may issue a command to the server.

If the webshell is uploaded to the server, it is very dangerous. Therefore, the webshell needs to be quickly detected. Accordingly, there is a need for a method and system that may minimize load on a server and may also quickly and accurately detect a webshell although a file corresponding to the webshell is encrypted or obfuscated.

The aforementioned information is provided to simply help the understanding and may include contents that do not form a part of the related art and may not include contents that the related art may present to those skilled in the art.

SUMMARY

An example embodiment may provide a webshell detection method that may detect a webshell by collecting process information about a process in execution on a server providing a web service and by determining whether the process is executed by the webshell based on the collected process information, and a computer system for detecting a webshell.

An example embodiment may provide a method that may accurately detect a webshell in real time without analyzing the contents of a file in a server by determining that a corresponding process is executed by a webshell if a data set corresponding to process information about the process in execution includes a specific or preset pattern, such as using a command line generally not used.

According to an aspect of at least one example embodiment, a webshell detection method performed by a computer system includes collecting process information about a process in execution on a server providing a web service, and determining whether the process is executed by a webshell based on the collected process information.

The webshell detection method may further include notifying an administrator of the server that the webshell is detected in response to a results of the determining indicating that the process is executed by the webshell.

The collecting may include generating a data set about the process based on the collected process information, and the determining may include determining whether the generated data set includes a pattern, and determining that the process is executed by the webshell in response to the generated data set being determined to include the pattern.

The collecting may include collecting a process identifier (PID) about the process, and collecting additional process information about the process based on the collected PID. The additional process information may include at least one of a name of the process, a command line (cmdline) executed in association with the process, system account information that executes the process, a process ID of a parent process (PPID) associated with the process, a name of the parent process, a command line (cmdline) executed in association with the parent process, and system account information that executes the parent process, and the data set may include the PID and the additional process information.

The determining whether the generated data set includes the pattern may include determining whether system account information (e.g., owner) that executes the process matches system account information that executes the web service or whether a parent process of the process is executed by the web service, and determining whether a command line executed in association with the process includes a non-generic command line in response to the system account information that executes the process being determined to match the system account information that executes the web service or in response to the parent process of the process being determined to be executed by the web service.

The determining whether the process is executed by the webshell based on the collected process information may include determining that the process is executed by the webshell in response to the command line executed in association with the process being determined to include the non-generic command line.

The non-generic command line may include at least one of ps, ls, cd, cat, or find.

The command line executed in association with the process may be determined to include the non-generic command line in response to the command line executed in association with the process being determined to include a command line aside from a preset generic command line.

The parent process of the process may be determined to be executed by the web service in response to the system account information that executes the parent process of the process being determined to match the system account information that executes the web service.

The parent process of the process may be determined to be executed by the web service in response to the system account information that executes the parent process of the process being apache or nobody.

The webshell detection method may further include adding another generated data set to a waiting queue, and sequentially determining whether the another generated data set includes the pattern may be determined with respect to the another generated data set added to the waiting queue.

The additional process information may include at least two of the name of the process, the command line (cmdline) executed in association with the process, the system account information that executes the process, the PPID associated with the process, the name of the parent process, the command line (cmdline) executed in association with the parent process, or the system account information that executes the parent process, and the pattern may be preset for the additional process information.

According to another aspect of at least one example embodiment, a computer system for detecting a webshell includes at least one processor configured to execute computer-readable instructions. The at least one processor is configured to collect process information about a process in execution on a server providing a web service, and determine whether the process is executed by a webshell based on the collected process information.

The at least one processor may further configured to notify an administrator of the server that the webshell is detected in response to a result of the determination indicating that the process is executed by the webshell.

The at least one processor may be further configured to generate a data set about the process based on the collected process information, and determine whether the process is executed by a webshell based on the collected process information by determining whether the generated data set includes a pattern, and determining that the process is executed by the webshell in response to the generated data set being determined to include the pattern.

The at least one processor may be further configured to determine whether system account information that executes the process matches system account information that executes the web service or whether a parent process of the process is executed by the web service, determine whether a command line executed in association with the process includes a non-generic command line in response to the system account information that executes the process being determined to match the system account information that executes the web service or in response to the parent process of the process being determined to be executed by the web service, and determine that the process is executed by the webshell in response to the command line executed in association with the process being determined to include the non-generic command line.

According to some example embodiments, it is possible to accurately detect a webshell in real time and to minimize load on a server without analyzing the contents of a file in the server by detecting the webshell based on process information collected about a process in execution.

According to some example embodiments, a webshell is detected based on an action of a process executed by the webshell not the contents of a file corresponding to the webshell. Therefore, although the file corresponding to the webshell is encrypted or obfuscated or the contents thereof are changed, the webshell may be accurately detected.

Further areas of applicability will become apparent from the description provided herein. The description and specific examples in this summary are intended for purposes of illustration only and are not intended to limit the scope of the present disclosure.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments are described with reference to the accompanying drawings.

Figure 1:
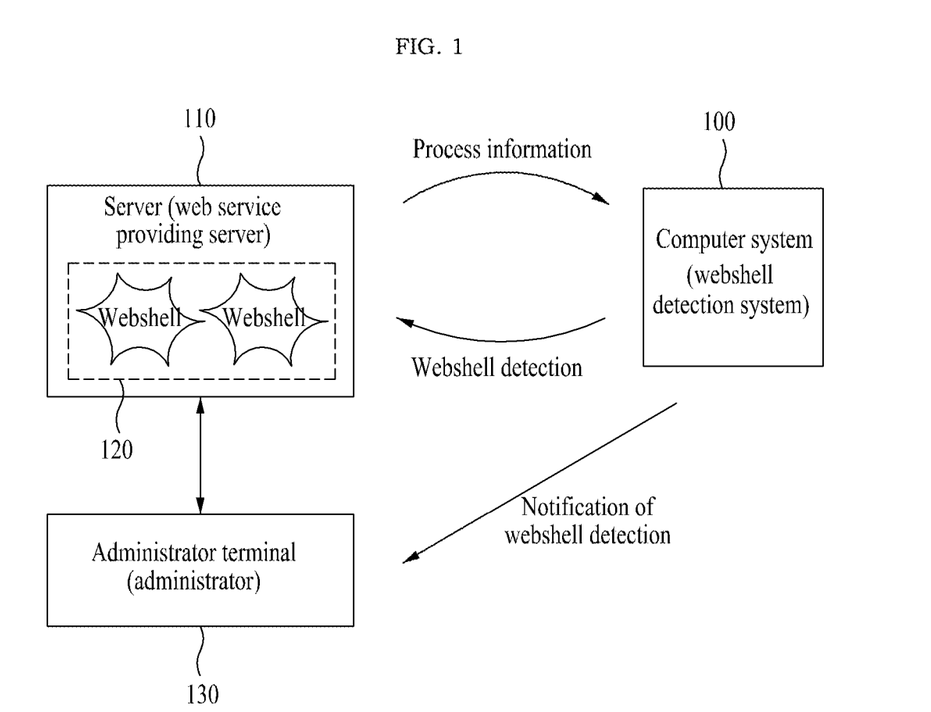
FIG. 1 illustrates an example of a method of detecting a webshell based on process information about a process in execution on a server providing a web service according to at least one example embodiment.

FIG. 1 illustrates an example of a method of detecting a webshell based on process information about a process in execution on a server providing a web service according to at least one example embodiment.

FIG. 1 illustrates operations of a server (a web service providing server) 110 configured to provide a web service, an administrator (an administrator terminal used by an administrator) 130 configured to manage the server 110, and a computer system (a webshell detection system) 100 configured to detect a webshell 120 that attacks the server 110.

The server 110 may be a web server configured to provide a web service. The webshell 120 may refer to a code that allows a malicious user, such as a hacker, to issue a command to the server 110 using the vulnerability of the server 110. The computer system 100 may be an apparatus configured to detect the webshell 120 uploaded to the server 110.

The computer system 100 may collect process information (e.g., information related to execution of a process) about a process (s) in execution on the server 110 that provides the web service and may detect presence or absence of the webshell 120 in the server 110 based on the collected process information. Also, in response to detecting the presence of the webshell 120, the computer system 100 may notify the administrator 130 of the server 110 that the webshell 120 is detected.

In the existing art, a search for a specific character string included in the webshell 120 is conducted to detect the webshell 120. For example, a search for a case in which a specific character string is detected in a packet is conducted. Thus, there is a need to verify whether important information is absent in the packet to detect the webshell 120.

In this case, a character string search needs to be conducted for all of files in the server 110, which may increase load on the server 110. According to an example embodiment, instead of detecting the webshell 120 by conducting a search a character string in a file, the webshell 120 may be detected based on process information about the executed process, which may reduce load on the server 110.

Further, in the related art, detection of the webshell 120 may be performed based on a long term only considering load burden of the server 110 that is desired to conduct a search for a character string in a file. However, according to an example embodiment, since the webshell 120 is detected based on process information about a process in execution, the webshell 120 may be detected in real time.

Further, according to an example embodiment, although a file corresponding to the webshell 120 is encrypted or obfuscated, there is no need to verify the contents of the file corresponding to the webshell 120 and the webshell 120 may be detected based on process information (i.e., an action of the process) about the process in execution.

Also, according to an example embodiment, since there is no need to verify the contents of the file corresponding to the webshell 120, it is possible to immediately and accurately detect even the new webshell 120 in which the character string of the file corresponding to the webshell 120 is changed (e.g., a pattern of the character string is changed).

Also, in the related art, to detect the new webshell 120, the webshell 120 may be detected by 1) securing the webshell 120 to be detected, 2) analyzing the secured webshell 120, 3) generating a pattern of the corresponding webshell 120 based on analyzed information, and 4) applying, that is, reflecting (e.g., updating) the pattern to a product. Therefore, a relatively long period of time may be used to detect the new webshell 120. In contrast, according to an example embodiment, since the webshell 120 may be detected based on process information (process execution information) about a process collected in real time, it is possible to immediately and accurately detect the new webshell 120.

A method of collecting, by the computer system 100, process information about a process(es) in execution on the server 110 and a method of detecting the webshell 120 based on the collected process information are further described with reference to FIGS. 2 to 5.

Figure 2:
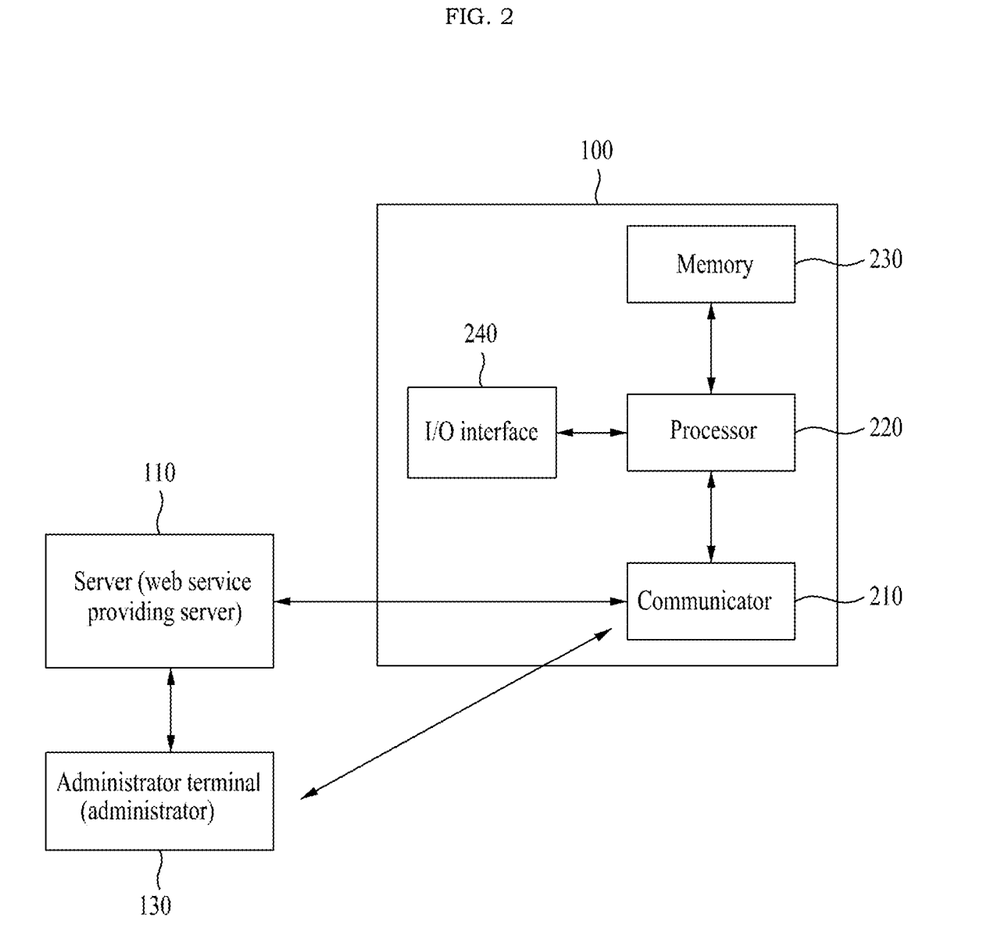
FIG. 2 is a diagram illustrating an example of a computer system to detect a webshell, a server configured to provide a web service, and an administrator terminal configured to manage the server providing the web service according to at least one example embodiment.

FIG. 2 is a diagram illustrating an example of a computer system configured to detect a webshell, a server configured to provide a web service, and an administrator terminal configured to manage the server providing the web service according to at least one example embodiment.

FIG. 2 illustrates the server 110 configured to provide the aforementioned web service, the administrator terminal 130 of the administrator configured to manage the server 110, and the computer system 100 configured to detect the webshell 120 that attacks the server 110.

The server 110 may be a web server that is configured to provide at least one web service. The web service may refer to a web-based service provided to a client side in response to a request from a client (not shown) or access from the client. The server 110 may be implemented using at least one computing apparatus.

The server 110 may be managed by the administrator through the administrator terminal 130. The administrator may refer to a user in charge of operation and security of the server 110. The administrator terminal 130 may refer to a user terminal used for the administrator to operate and manage the server 110. For example, the administrator terminal 130 may include, for example, a smartphone, a personal computer (PC), a laptop computer, a tablet, an Internet of things (IoT) device, and a wearable computer, other computing apparatuses added to the server 110, or a part of the server 110.

The computer system 100 may be an apparatus configured to detect the webshell 120 that attacks the server 110 or threatens the security of the server 110. The computer system 100 may be implemented using at least one computing apparatus. The computer system 100 may be implemented as a computing apparatus or a server separate from the server 110, that is, outside of the server 110. In some example embodiments, although not illustrated, the computer system 100 may be implemented as a part of the server 110. That is, the computer system 100 may be an apparatus included in the server 110.

The computer system 100 may collect process information about a process(es) (that is, each process) in execution on the server 110 that provides a web service. The process information may include information associated with execution of a process. The computer system 100 may determine whether the process associated with the process information is executed by the webshell 120 based on the collected process information and may detect the webshell 120.

The computer system 100 may include at least one computing apparatus.

Referring to FIG. 2, the computer system 100 may include a memory 230, a processor 220, a communicator 210, and an I/O interface 240.

The memory 230 may include a permanent mass storage device, such as a random access memory (RAM), a read only memory (ROM), and a disk drive, as a non-transitory computer-readable record medium. Here, the ROM and the permanent mass storage device may be included as a permanent storage device separate from the memory 230. Also, an OS and at least one program code may be stored in the memory 230. Such software components may be loaded from another non-transitory computer-readable record medium separate from the memory 230. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 230 through the communicator 210, instead of the non-transitory computer-readable record medium.

The processor 220 may be configured to process instructions of a computer program by performing basic arithmetic operations, logic operations, and I/O operations. The computer-readable instructions may be provided from the memory 230 or the communicator 210 to the processor 220. For example, the processor 220 may be configured to execute received instructions in response to the program code loaded to the memory 230. Through an operation by the processor 220, the computer system 100 may collect process information about a process in execution on the server 110 that provides a web service and may determine whether a process associated with the process information is executed by the webshell 120 based on the collected process information.

Although not illustrated, each of components of the processor 220 to perform collecting of process information and detection of the webshell 120 may be implemented as a software module and/or a hardware module as a portion of the processor 220 and may represent a function, for example, a functional block, implemented by the processor 220.

The communicator 210 may be a configuration for communication between the computer system 100 and another apparatus, for example, the server 110, the administrator terminal 130, another server, another user terminal, and the like. That is, the communicator 210 may be a hardware module, such as an antenna, a data bus, a network interface card, a network interface chip, and a networking interface portion of the computer system 100, or a software module, such as a network device driver and a networking program, to transmit and receive data and/or information to and from the other apparatus.

The communicator 210 may include a notifier configured to notify the administrator of the server 110, that is, the administrator terminal 130 that the webshell 120 is detected, if the process is determined to be executed by the webshell 120 based on the process information.

The I/O interface 240 may be a device for interface between an input device, such as a keyboard and a mouse, and an output device, such as a display and a speaker. Depending on example embodiments, the computer system 100 may not include the I/O interface 240.

Depending on some example embodiments, the computer system 100 may include a number of components greater than or less than a number of components shown in FIG. 2.

The technical features described above with reference to FIG. 1 may apply to FIG. 2, and thus further description is omitted.

In the following description, an operation performed by components, for example, the processor 220, of the computer system 100 may be described as an operation of the computer system 100 for clarity of description.

As described above, the computer system 100 may be implemented as a part of the server 110, and thus an operation performed by the computer system 100 or components of the computer system 100 may also be performed by the server 110. Further description related thereto is omitted.

Figure 3:
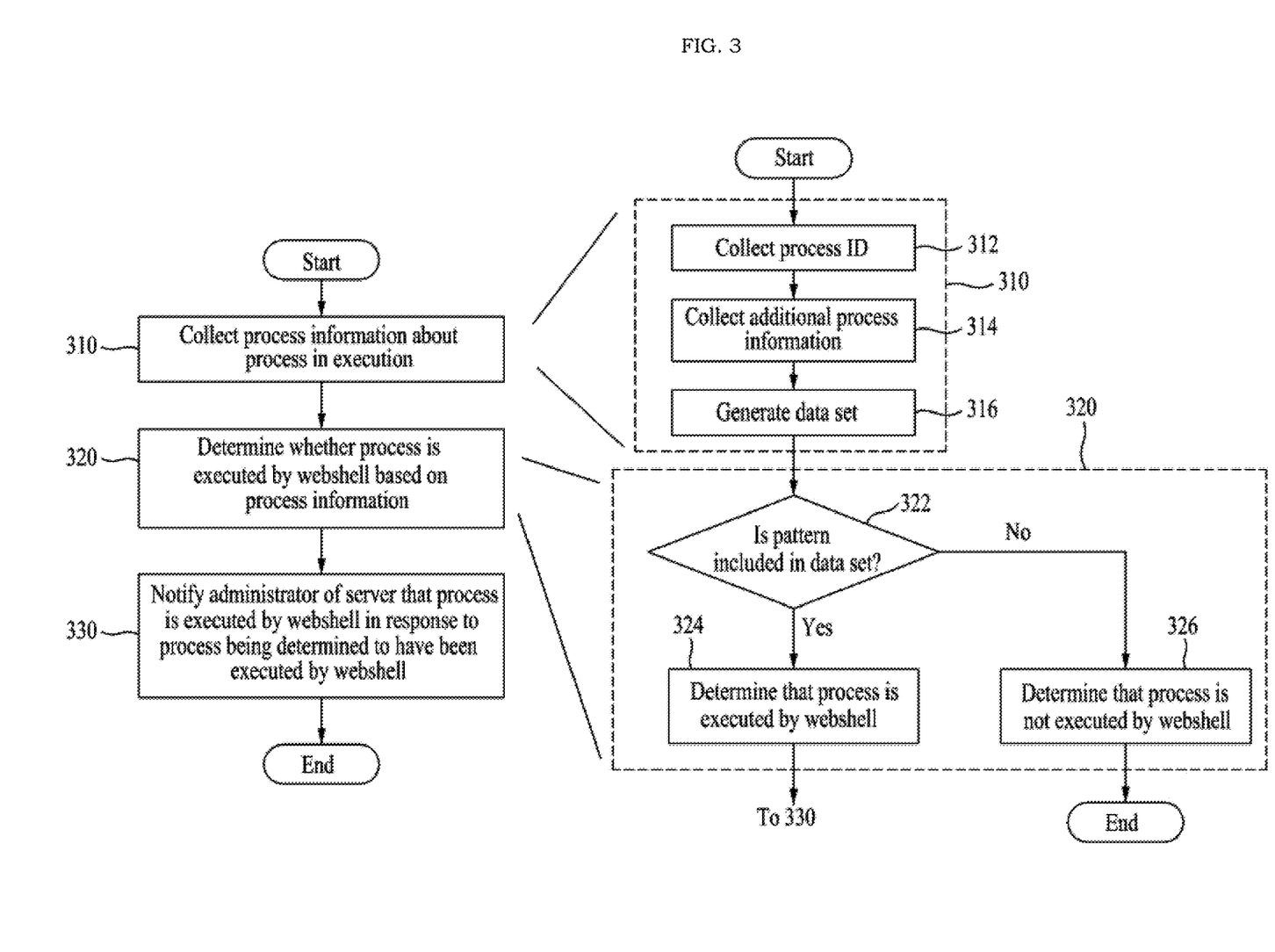
FIG. 3 is a flowchart illustrating an example of a method of detecting a webshell based on process information about a process in execution on a server providing a web service according to at least one example embodiment.

FIG. 3 is a flowchart illustrating an example of a method of detecting a webshell based on process information about a process in execution on a server providing a web service according to at least one example embodiment.

Referring to FIG. 3, in operation 310, the computer system 100 may collect process information about a process in execution, that is, running on the server 110 providing a web service. If a plurality of processes is running on the server 110, the computer system 100 may collect process information about each of the processes. The process information may be referred to as process execution information that is information associated with an execution of a process.

Collecting of the process information in operation 310 may be performed using a process notify. Such collecting of the process information may correspond to collecting process information to operate the server 110 or to collecting process information for virus detection. Accordingly, detection of the webshell 120 may be performed by collecting the process information for the operation of the server 110 or by collecting the process information for the virus detection.

In operation 320, the computer system 100 may determine whether a process associated with the collected process information is executed by the webshell 120 based on the collected process information. In response to the process associated with the collected process information being determined to be executed by the webshell 120, the computer system 100 may detect the webshell 120 (e.g., determine that the process is executed by the webshell 120). Therefore, the computer system 100 may detect the webshell 120 without verifying the contents of a file corresponding to the webshell 120 or a character string of a file stored on the server 110. Further, the computer system 100 may accurately detect the webshell 120 regardless of encryption/obfuscation/change of the file corresponding to the webshell 120. Still further, the computer system 100 may detect the webshell 120 in real time by detecting the webshell 120 based on process information about the process in execution.

In operation 330, in response to the process associated with the collected process information being determined to have been executed by the webshell 120, the computer system 100 may notify the administrator of the server 110, that is, the administrator terminal 130, that the webshell 120 is detected. Through this notification, the administrator of the server 110 may verify presence of the webshell 120 that threatens the server 110, and in response thereto may take an appropriate action. The administrator may receive an attack/ infringement situation by the webshell 120 from the computer system 100 in real time. This notification may be performed through the aforementioned notifier with respect to the administrator terminal 130.

Hereinafter, operation 310 of collecting process information is further described.

In operation 312, the computer system 100 may collect a process identifier (PID) about the process in execution on the server 110 providing the web service.

In operation 314, the computer system 100 may collect additional process information about the corresponding process based on the collected PID. The collected additional process information may include at least one of a name of a corresponding process, a command line (cmdline) executed in association with the process, system account information (owner) that executes the process, a process ID of a parent process (PPID) (e.g., a parent process ID) associated with the process, a name of the parent process, a command line (cmdline) executed in association with the parent process, and system account information (owner) that executes the parent process. The parent process may represent an upper process of the process. The parent process is not limited to a direct upper process of a work process and may include an upper process or more of the corresponding upper process.

In operation 316, the computer system 100 may generate a data set about a process based on the collected process information. The generated data set may refer to data processed from the collected process information to be suitable for determining whether the process is executed by the webshell 120. The generated data set may include the PID collected in operation 312 and the additional process information collected in operation 314.

The computer system 100 may determine whether the process associated with the process information is executed by the webshell 120 by analyzing the data set based on the collected process information.

Hereinafter, operation 320 of determining whether the process associated with process information is executed by the webshell 120 is further described.

In operation 322, the computer system 100 may determine whether the data set generated in operation 316 includes a specific (or alternatively, preset) pattern. The specific pattern may represent that a process associated with the corresponding data set is executed by the webshell 120. The specific pattern may be preset by the user (or a developer) of the computer system 100 or the administrator of the server 110. By comparing the data set generated in operation 316 to the specific pattern, whether the process associated with the corresponding data set is executed by the webshell 120 may be determined.

In operation 324, in response to the data set generated in operation 316 being determined to include the specific pattern, the computer system 100 may determine that the process associated with the corresponding data set is executed by the webshell 120.

On the contrary, in operation 326, in response to the data set generated in operation 316 being determined to not include the specific pattern, the computer system 100 may determine that the process associated with the corresponding data set is not executed by the webshell 120.

The specific pattern may refer to a pattern preset for additional process information. For example, the preset pattern may be set as a pattern in which at least two pieces of information includable in the additional process information are combined. That is, the additional process information may include at least two of a name of the process, a command line (cmdline) executed in association with the process, system account information that executes the process, a process ID of a parent process (PPID) associated with the process, a name of the parent process, a command line (cmdline) executed in association with the parent process, and system account information that executes the parent process. The specific pattern may refer to a pattern for the additional process information and may be a pattern in which at least two pieces of information included in the additional process information are combined.

A method of detecting the webshell 120 depending on whether the generated data set includes the specific pattern is further described with reference to FIG. 4.

The data set generated in operation 316 may be added to a waiting queue. In operation 322, whether the added data set includes the specific pattern may be determined sequentially with respect to the data set added to the waiting queue. Therefore, if a plurality of data sets associated with a plurality of processes is added to the waiting queue, operation 322 may be sequentially performed. That is, whether a corresponding process is executed by the webshell 120 may be determined with respect to a single process. Subsequently, whether a corresponding subsequent process is executed by the webshell 120 may be determined with respect to the subsequent process.

The technical features described above with reference to FIGS. 1 and 2 may apply to FIG. 3, and thus are not repeated.

Figure 4:
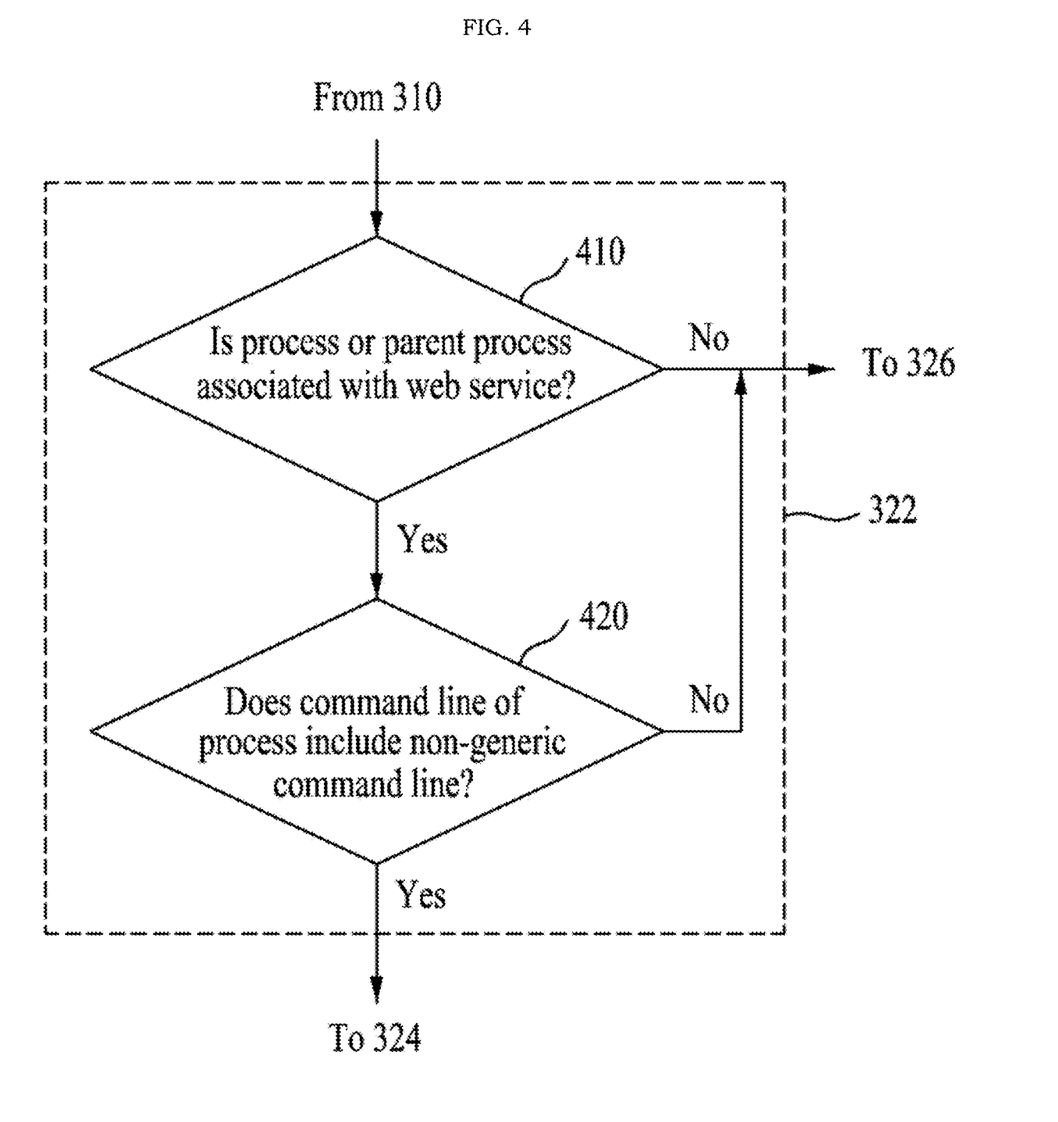
FIG. 4 is a flowchart illustrating an example of a method of determining whether a corresponding process is executed by a webshell based on a pattern included in process information according to at least one example embodiment.

FIG. 4 is a flowchart illustrating an example of a method of determining whether a corresponding process is executed by a webshell based on a pattern included in process information according to at least one example embodiment.

Referring to FIG. 4, in operation 410, the computer system 100 may determine whether a process associated with the collected process information (e.g., the generated data set) or a parent process of the process is associated with a web service provided from the server 110. For example, the computer system 100 may determine whether system account information (owner) that executes the process associated with the collected process information matches system account information that executes the web service provided from the server 110, or whether the parent process of the process is executed by the web service. In response to the system account information that executes the process being determined to not match the system account information that executes the web service provided from the server 110 or in response to the parent process of the process being determined to not be executed by the web service, the computer system 100 may determine that the process is not executed by the webshell 120. That is, if the process associated with the collected process information and the parent process of the process are not associated with the web service provided from the server 110, the computer system 100 may determine that the corresponding process is not executed by the webshell 120.

In operation 420, in response to the process associated with the collected process information and the parent process of the process being determined to be associated with the web service provided from the server 110, for example, in response to the system account information that executes the process associated with the collected process information being determined to match the system account information that executes the web service provided from the server 110 or in response to the parent process of the process being determined to be executed by the web service, the computer system 100 may determine whether a command line executed in association with the process includes a non-generic command line.

In response to the command line executed in association with the process being determined to not include the non-generic command line, the computer system 100 may determine that the corresponding process is not executed by the webshell 120.

On the contrary, in response to the command line executed in association with the process being determined to include the non-generic command line, the computer system 100 may determine that the corresponding process is executed by the webshell 120.

For example, if a parent process of a process associated with collected process information is a web service (or the parent process is a process executed by the web service) and the process executes a command line generally not executed by the process, the corresponding process may be determined to be executed by the webshell 120.

Also, if system account information (owner) that executes a process associated with collected process information matches system account information that executes a web service and the process executes a command line generally not by the process, the corresponding process may be determined to be executed by the webshell 120.

The aforementioned non-generic command line may include, for example, at least one of ps, ls, cd, cat, and find as a preset non-generic command line. The non-generic command line may refer to a command line that a process executed by the web service provided from the server 110 generally does not execute. The non-generic command line may be preset by the user (or the developer) of the computer system 100 or the administrator of the server 110.

In some example embodiments, if the command line executed in association with the process includes a command line aside from a specific (or alternatively, preset) generic command line, the computer system 100 may determine that the command line executed in association with the process includes the non-generic command line. That is, not the non-generic command line but the generic command line (a command line generally executed by the process executed by the web service) may be preset. In response to execution of another command line aside from the generic command line by the process, the corresponding process may be determined to include the non-generic command line.

Meanwhile, in determining whether the parent process of the process is executed by the web service, system account information that executes the parent process may be compared to system account information that executes the web service. If the system account information that executes the parent process of the process matches the system account information that executes the web service, the parent process of the process may be determined to be executed by the web service or to correspond to the web service.

In some example embodiments, if the system account information that executes the parent process of the process is apache or nobody, the parent process of the process may be determined to be executed by the web service or to correspond to the web service. Here, apache or nobody may be an example of system account information (owner) that executes the web service.

As described above, the specific pattern may represent a combined pattern for "system account information that executes a process" and "command line executed in association with a process." In some example embodiments, the specific pattern may represent a combined pattern for "system account information that executes a parent process of a process" and "command line executed in association with a process."

Accordingly, the computer system 100 according to an example embodiment may preset a specific pattern(s) corresponding to an operation of a process executed by the webshell 120 or a situation occurring in response to execution of the webshell 120, and may detect the webshell 120 in response to detecting the specific pattern from collected process information.

According to an example embodiment, the specific pattern corresponding to the webshell 120 may be set based on the following two features occurring in response to execution of the webshell 120. Initially, 1) since the webshell 120 is executed through the web service provided from the server 110, the process executed by the webshell 120 may be executed as a child process of the web service or may be executed as the same system account as that of the web service at a time of execution. Next, 2) in response to execution of the webshell 120, a command line generally not executed at the web service (a process associated with the web service) may be executed. If a non-generic command line aside from a command line generally executed by the process corresponding to the web service or a process corresponding to a lower process thereof is executed by combining the features 1) and 2), it may be determined that the webshell 120 is executed and the specific pattern(s) corresponding thereto may be set.

Meanwhile, depending on some example embodiments, a name of a process may be used for determination in operation 410 instead of the aforementioned system account (system account information). For example, operation 410 may relate to determining whether the name of the process matches a name of a process associated with the web service or whether a name of a parent process of the process matches the name of the process associated with the web service.

The technical features described above with reference to FIGS. 1 to 3 may apply to FIG. 4, and thus are not repeated.

Figure 5:
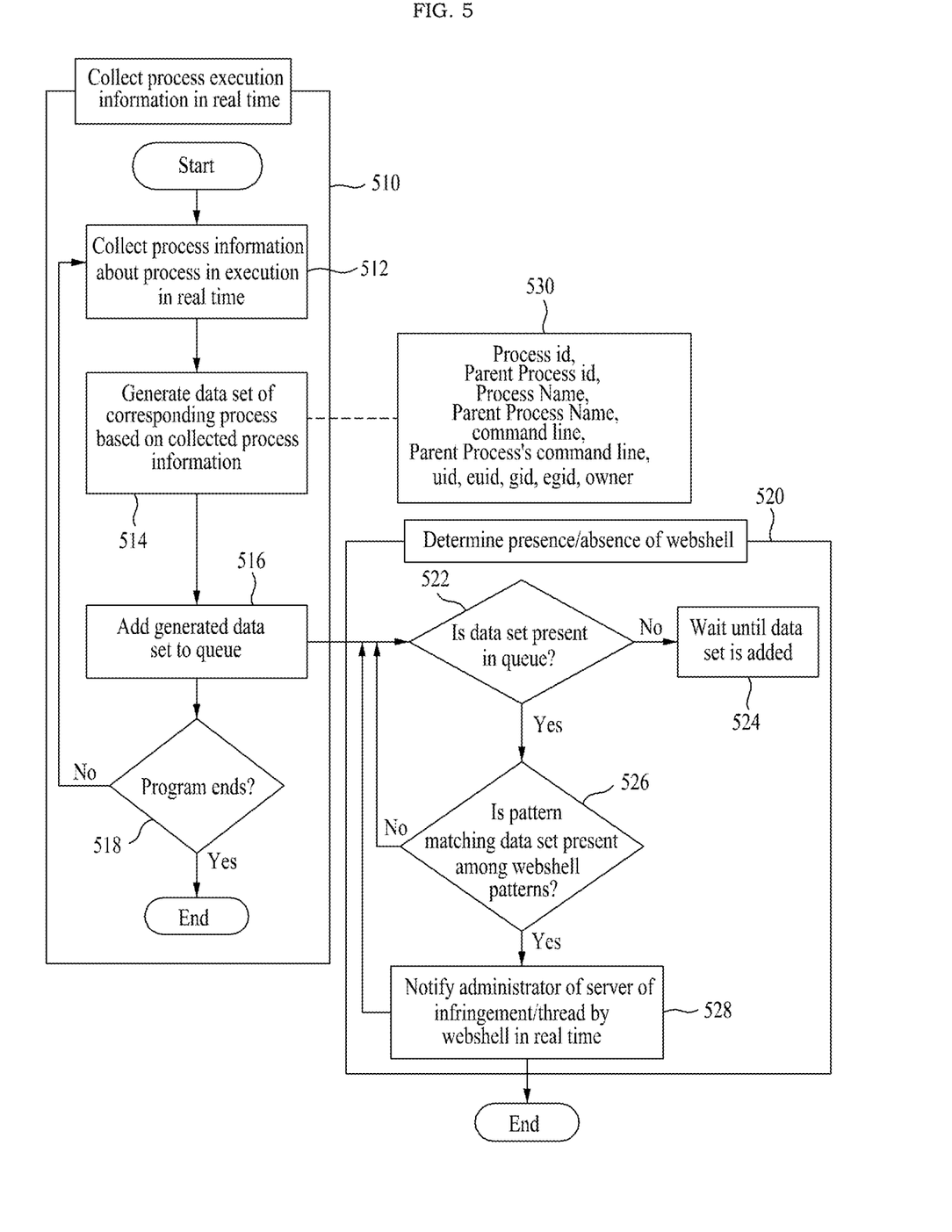
FIG. 5 is a flowchart illustrating an example of a method of collecting process information about a process in real time and a method of detecting a webshell based on collected process information according to at least one example embodiment.

FIG. 5 is a flowchart illustrating an example of a method of collecting process information about a process in real time and a method of detecting a webshell based on collected process information according to at least one example embodiment.

A box 510 represents performing a function of collecting process execution information about a process in execution on the server 110 of the computer system 100 in real time.

The computer system 100 may collect process information about the process in execution on the server 110 in real time in operation 512 and may generate a data set corresponding to the process based on the collected process information in operation 514. A box 530 represents examples of the process information included in the data set. Data aside from a process ID may correspond to additional process information. The computer system 100 may add the generated data set to a queue in operation 516 and may terminate or repeat the function of collecting process information in operation 518.

A box 520 represents performing a function of determining whether the webshell 120 that threatens the server 110 of the computer system 100 is present.

In operation 522, the computer system 100 may determine whether the data set is present in the queue. If the data set is absent in the queue, the computer system 100 may wait until the data set is added to the queue in operation 524. On the contrary, if the data set is present in the queue, the computer system 100 may determine whether a specific pattern (a webshell pattern) is present in the data set in operation 526. The computer system 100 may continuously determine whether a subsequent data set is present if the specific pattern is absent in the data set, and may detect presence of the webshell 120 if the preset pattern is present in the data set. In response to detecting the presence of the webshell 120, the computer system 100 may notify the administrator of the server 110 of infringement/threat by the webshell 120 in real time in operation 528.

The technical features described above with reference to FIGS. 1 to 4 may apply to FIG. 5 and thus are not repeated.

The systems or apparatuses described above may be implemented using hardware components or a combination of hardware components and software components. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the above-described example embodiments may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by Appstore that distributes applications or a site, a server, and the like that supplies and distributes other various types of software.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A webshell detection method performed by a computer system, comprising:
   collecting process information about a process in execution on a server providing a web service;
   generating a data set about the process based on the collected process information, the generated data set including a process identifier (PID) about the process and additional process information about the process based on the PID;
   determining whether the generated data set includes a pattern; and
   determining whether the process is executed by a webshell based on a result of the determining whether the generated data set includes the pattern,
   wherein the pattern is preset based on a combination of at least two pieces of information includable in the additional process information.

2. The webshell detection method of claim 1, further comprising:
   notifying an administrator of the server that the webshell is detected in response to a results of the determining whether the process is executed by a webshell indicating that the process is executed by the webshell.

3. The webshell detection method of claim 1, wherein the additional process information comprises at least two of a name of the process, a command line (cmdline) executed in association with the process, system account information that executes the process, a process ID of a parent process (PPID) associated with the process, a name of the parent process, a command line (cmdline) executed in association with the parent process, or system account information that executes the parent process.

4. The webshell detection method of claim 1, wherein the determining whether the generated data set includes the pattern comprises:
   determining whether system account information that executes the process matches system account information that executes the web service or whether a parent process of the process is executed by the web service; and
   determining whether a command line executed in association with the process includes a non-generic command line in response to the system account information that executes the process being determined to match the system account information that executes the web service or in response to the parent process of the process being determined to be executed by the web service.

5. The webshell detection method of claim 4, wherein the determining whether the process is executed by the webshell based on the collected process information comprises determining that the process is executed by the webshell in response to the command line executed in association with the process being determined to include the non-generic command line.

6. The webshell detection method of claim 5, wherein the non-generic command line comprises at least one of ps, is, cd, cat, or find.

7. The webshell detection method of claim 5, wherein the command line executed in association with the process is determined to comprise the non-generic command line in response to the command line executed in association with the process being determined to include at least one command line aside from a generic command line.

8. The webshell detection method of claim 4, wherein the parent process of the process is determined to be executed by the web service in response to the system account information that executes the parent process of the process being determined to match the system account information that executes the web service.

9. The webshell detection method of claim 4, wherein the parent process of the process is determined to be executed by the web service in response to the system account information that executes the parent process of the process being apache or nobody.

10. A webshell detection method performed by a computer system comprising:
collecting process information about a process in execution on a server providing a web service, the collecting including generating a data set about the process based on the collected process information;
determining whether the process is executed by a webshell based on the collected process information, the determining including,
determining whether the generated data set includes a pattern, and
determining that the process is executed by the webshell in response to the generated data set being determined to include the pattern;
adding the generated data set to a waiting queue; and
sequentially determining whether the generated data set includes the pattern with respect to the generated data set added to the waiting queue.

11. The webshell detection method of claim 10, wherein the generated data set includes a process identifier (PID) about the process and additional process information about the process based on the PID,
the additional process information comprises at least two of a name of the process, a command line (cmdline) executed in association with the process, system account information that executes the process, a process ID of a parent process (PPID) associated with the process, a name of the parent process, a command line (cmdline) executed in association with the parent process, or a system account information that executes the parent process, and
the pattern is preset for the additional process information.

12. A non-transitory computer-readable record medium storing instructions that, when executed by at least one processor, cause a computer system to perform the webshell detection method of claim 1.

13. A computer system for detecting a webshell, the computer system comprising:
at least one processor configured to execute computer-readable instructions,
wherein the at least one processor is configured to cause the computer system to,
collect process information about a process in execution on a server providing a web service,
generate a data set about the process based on the collected process information, the generated data set including a process identifier (PID) about the process and additional process information about the process based on the PID,
determine whether the generated data set includes a pattern, and
determine whether the process is executed by a webshell based a result of a determination whether the generated data set includes the pattern,
wherein the pattern is preset based on a combination of at least two pieces of information includable in the additional process information.

14. The computer system of claim 13, wherein the at least one processor is further configured to cause the computer system to notify an administrator of the server that the webshell is detected in response to a result of a determination whether the process is executed by a webshell indicating that the process is executed by the webshell.

15. The computer system of claim 13, wherein the at least one processor is further configured to cause the computer system to,
determine whether system account information that executes the process matches system account information that executes the web service or whether a parent process of the process is executed by the web service,
determine whether a command line executed in association with the process includes a non-generic command line in response to the system account information that executes the process being determined to match the system account information that executes the web service or in response to the parent process of the process being determined to be executed by the web service, and
determine that the process is executed by the webshell in response to the command line executed in association with the process being determined to include the non-generic command line.

16. The computer system of claim 15, wherein the at least one processor is further configured to cause the computer system to determine determining whether the process is executed by the webshell by determining that the process is executed by the webshell in response to the command line executed in association with the process being determined to include the non-generic command line.

17. The computer system of claim 16, wherein the at least one processor is further configured to cause the computer system to determine that the command line executed in association with the process comprises the non-generic command line, in response to the command line executed in association with the process being determined to include at least one command line aside from a generic command line.

18. The computer system of claim 15, wherein the at least one processor is further configured to cause the computer system to determine the parent process of the process to be executed by the web service in response to the system account information that executes the parent process of the process being determined to match the system account information that executes the web service.

19. The computer system of claim 15, wherein the at least one processor is further configured to cause the computer system to determine the parent process of the process to be executed by the web service in response to the system account information that executes the parent process of the process being apache or nobody.

20. The computer system of claim 13, wherein the at least one processor is further configured to cause the computer system to,
add the generated data set to a waiting queue, and
sequentially determine whether a subsequently generated data set includes the pattern with respect to the generated data set added to the waiting queue.

* * * * *